UNITED STATES PATENT OFFICE.

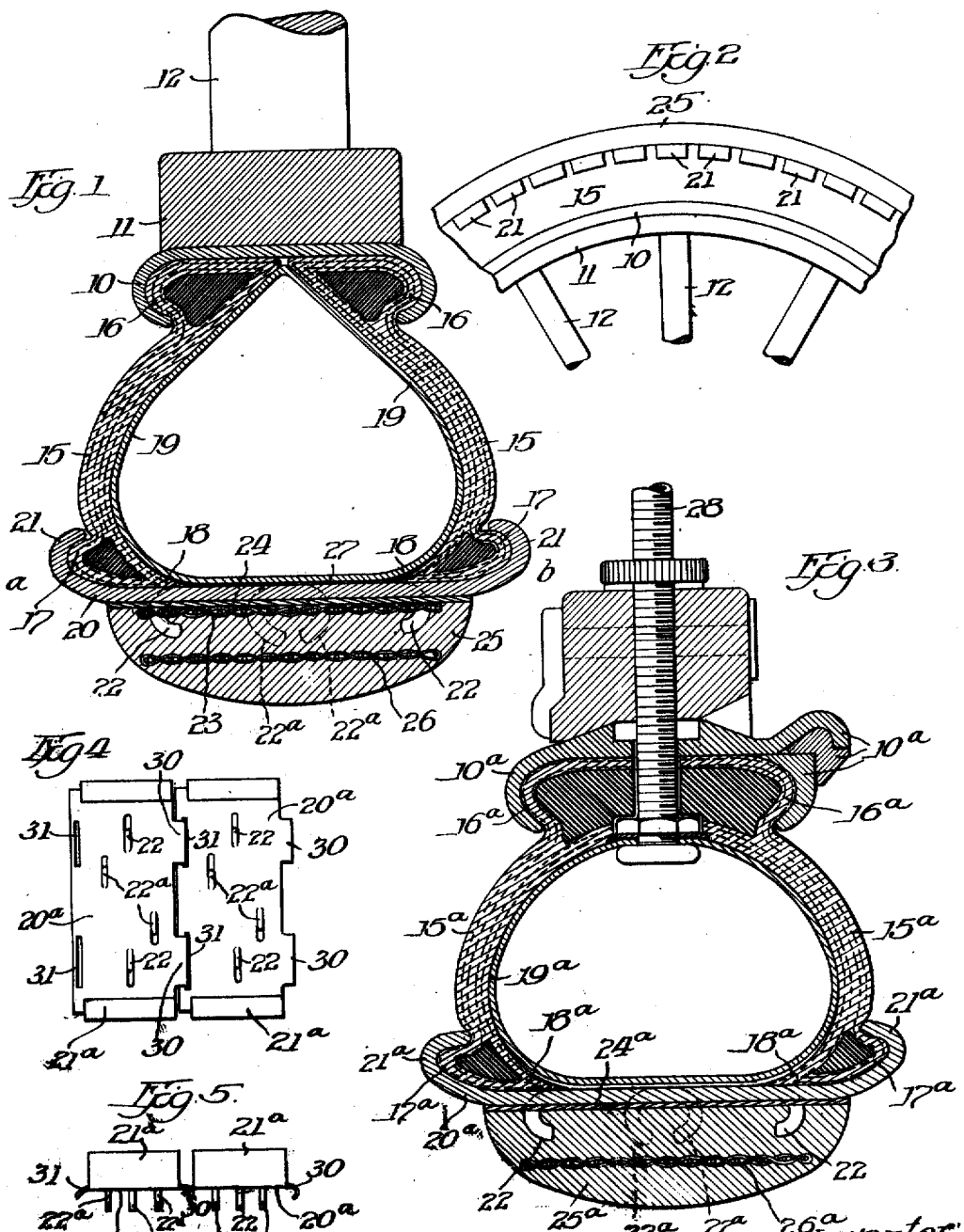

DE LEON DAVIS, OF CHICAGO, ILLINOIS.

PNEUMATIC TIRE.

1,319,697.   Specification of Letters Patent.   Patented Oct. 28, 1919.

Application filed February 1, 1915. Serial No. 5,464.

*To all whom it may concern:*

Be it known that I, DE LEON DAVIS, a citizen of the United States, residing in the city of Chicago, county of Cook, and State of Illinois, have invented certain new and useful Improvements in Pneumatic Tires, of which the following is a specification.

My invention relates to pneumatic tires, and has more particular reference to such as are provided with auxiliary tread portions. Its objects are broadly to provide a tire having pneumatic cushioning properties which will last long in service, is of simple construction and adapted to effect a saving in manufacturing cost. More specific objects are to provide a pneumatic tire in which a substantially solid tread portion is adapted to take the rough wear of service while protecting the more vulnerable portions of the tire from injury, such tread portion being replaceable by a new one from time to time at relatively small cost. An important object is to provide a pneumatic tire in which the impact forces of service upon the tread element normally toward the center of the wheel are communicated to a large extent directly to the principal cushioning element, namely, the inner tube; and to provide a tire in which a relatively wide annular area on the inner tube is adapted to receive the impact forces whereby a relatively small degree of indentation or flattening of the tire upon the ground in service will create a relatively great compression within the inner tube, thus saving the side portions or casing of the tire from much of the destruction incident to the repeated flattening or bending to a considerable extent of these parts in service. Another object of the invention is to provide a pneumatic tire having a substantially heavy auxiliary tread portion, and which tire complete may have a thickness, from the rim of the wheel to the tread periphery of the tire the same as that of the ordinary type of tire for a given size of rim, thus adapting it for service on wheels now in use without providing additional clearance in the fenders, etc., or changing the speedometer. A still further object is to provide a pneumatic tire having a relatively wide tread portion coupled with the other features hereinabove pointed out. Still other objects and advantages will appear hereinafter.

In the accompanying drawings, which form a part of this specification, Figure 1 is a cross section of the preferred form of my improved tire in association with elements of a wheel;

Fig. 2 is a small fragmentary side view of the tire of Fig. 1 in its normal position for use;

Fig. 3 is a view similar to that of Fig. 1 showing a modified arrangement;

Fig. 4 is a small top plan of clencher elements or tread plates similar to those of Figs. 1 and 2 but being hinged together; and Fig. 5 is a side view of the plates of Fig. 4.

Referring to Fig. 1 the clencher rim 10, wheel felly 11 and spoke 12 may be of the usual well known construction. In this form of the invention I provide a pair of continuous annular side walls 15, separable and independent of each other, having the usual well known clencher ribs or projections 16 at their inner portions respectively and similar clencher ribs 17 at their outer portions. The words "inner" and "outer" in this specification will be understood as having reference to directions toward and away from the hub of the wheel on the plane of the sides of the tire walls. The outer portions of the casing or side walls 15 are spaced apart so that there is a substantial area between the edges 18 of the oppositely disposed tire walls. In practice I prefer to have these edge portions 18 spaced apart substantially to the relative extent shown in the illustrations. The outer surfaces of the portions 18 respectively are preferably formed so that there is a substantially straight line from one to the other at any given place, as the line a—b, which line preferably forms a sector of a circle inscribable within the tire and with substantially the center of the tire as the center of such circle.

The tread element of Fig. 1 comprises first a plurality of metallic or other suitable hard and substantially unyielding plates 20, quite similar in outline to the plates 20ᵃ of Fig. 4, but not having the hinge, or interlocking provisions there shown, the plates 20 of Fig. 1 lying edge to edge around the tire, and each thereof provided with turned over clencher elements 21 adapted to engage the ribs 17 of the side walls. The plates 20 and 20ᵃ are provided with tongues or projections, as 22, 22ª, stamped up from the body of the plates respectively, these projections being adapted to pass through an annular continuous metallic fabric 23, substantially non-expansible in its properties, the ends thereof being rigidly secured together to form a true ring, the projections 22, 22ª being bent down upon the fabric 23 sufficiently to hold the same against retraction therefrom. In constructing the tread element I first place a layer of preferably soft rubber 24 upon the plates 20 before applying the fabric 23. Upon the continuous ring thus formed I secure, preferably by molding and vulcanizing, the tread 25, preferably made of rubber compound, the vulcanizing causing the parts 24 and 25 to unite with each other through the interstices of the mesh fabric 23 and firmly securing the tread 25 to the plates 20. The rubber strip 24 or 24ª also provides a cushion and seal between adjacent plates, and the strip 24 provides also a cushion between the plates and the fabric 23. Before the vulcanizing is done, however, a reinforcing element 26, which I have shown as a second metallic mesh fabric, but which may be of other suitable shape or material, annular and with its ends preferably secured together, may be inserted in the mass to be vulcanized and completely embodied within the tread 25. The reinforcing element 26, comprising one or more wire rings within the tread, coöperates in rendering this tread substantially non-expansible and strengthens the tread in service. An apron or shield 27, suitably consisting of strong fabric such as canvas, is interposed between the plates 20 and the inner tube 19 to prevent injury of the inner tube due to frictional movement at this place.

In the device of Fig. 3 I have shown the side walls 15ª as being united at their bases respectively, thus forming a one-piece, annular, substantially U-shaped casing, having clencher elements 16ª adapted to be held by a well known type of demountable rim 10ª which requires no detailed description. In this figure I have also shown the air tube 28 in communication with the inner tube 19ª, also of well known construction. The only substantial difference in this modification over the device of Fig. 1, apart from the unitary nature of the casing 15ª, is in the construction of the tread element. The plates 20ª (shown also in Figs. 4 and 5), have the projections 22 and 22ª adapted to serve as coöperating means for holding the tread 25ª thereupon. On one end of each of the plates 20ª I provide a tongue, as 30, hook-shaped so as to pass through a suitable opening 31 in the contiguous plate, as well shown in Fig. 5. By this arrangement the plates 20ª are hingedly interlocked and provide a strong and substantially non-expansible rings. It will be noted that the non-expansible fabric 23 of Fig. 1 is now dispensed with. The reinforcing fabric 26ª may be employed here as in the device of Fig. 1. In vulcanizing the tread 25ª to the plates 20ª I preferably employ the strip of high grade rubber 24ª next to the plates. The invention is not limited to the form and character of the projections 22, 22ª, nor to vulcanizing for securing the tread to the plates. The tread 25 or 25ª may be of any suitable pliable material, and I contemplate using woven fabric with adhesive substances for this element.

As the plates 20 and 20ª are of strong, substantially unyielding material, such as iron of material thickness, it will be apparent that the open space between the portions 18 or 18ª respectively is bridged by a tire element adapted to convey the forces of service impact over a relatively wide area of the inner tube owing to the width of the plates from side to side of the tire and their length in the direction of the circumference of the tire as well as to their strong and substantially unyielding properties. It will be appreciated also that an impact force which would cause the ordinary tire of commerce (substantially circular in cross section) to be indented deeply, tending to induce fracture of the material, would, in the present form of device cause but relatively slight movement of the side walls, and this for several reasons, among which may be mentioned that a relatively slight movement of a plate or plates toward the center of the wheel will cause a substantially large compression of the inflating air. The action of the plates may be compared to that of a large piston adapted to compress the air. It will be noted also that the arrangement of the side walls or casing of the tire is such that service strains or impacts upon the tread place these side walls under compression in the directions of the radii of the wheel, and that the resistance to such compression must be overcome before bending of the side walls occurs. It will also be noted that when such bending does take place it is on easy lines between the clencher elements 10 and 21, or 10ª and 21ª, and that service strains or impacts upon the tread are practically incapable of producing an abrupt bending of the side walls, thus providing a freedom of the device from the ordinary casualties of the road, and contributing to long service.

The side walls 15, 15ª are relatively short when compared with the ordinary type of tire casing, which makes for economy in manufacture, and when made in two pieces, as shown in Fig. 1, the construction is simplified. One or both may be replaced from time to time, as is true also of the tread element 25, 25ª, and thus in case of wear or injury to one element it is not necessary to throw the entire tire away. These side walls may be of the usual materials employed in tire casings, and be made according to methods well understood in the art.

I desire also to note the importance of preserving the outer substantially standard diameter of tires having a given standard internal diameter, owing to the fact that some automobiles and the like are so constructed that a tire having a greater outside diameter than the standard for a given size of wheel rim would contact the mud guards or other projecting parts, and the speedometer would register less mileage than would be warranted by the travel. In my present construction I am able to attain the important results hereinabove pointed out while maintaining the standard diameters.

I also conceive that the present invention provides material advantage in that lines of sudden impact force applied to the tread at an angle to the plane of the side of the wheel will be changed in their direction toward the center of the wheel by the plates 20 or 20ª.

It will be noted that the clencher elements 21, 21ª are substantially beyond the plane of the casing sides, thus protecting the casing to a material extent. The tire as a whole is singularly free from mishaps such as punctures, rips and blowouts.

While I have illustrated and described a preferred and modified construction and arrangement, other modifications may be made within the spirit of the invention. Reference should therefore be had to the appended claims to determine what I contemplate as falling within the scope of the invention or improvements herein set forth.

I claim:

1. In a tire having annular side walls with clencher elements on the outer portions thereof respectively, the combination therewith of a tread element comprising a plurality of plates side by side in annular arrangement and having clencher elements adapted to interlock with the clencher elements of said side walls, an annular non-expansible pliable metallic fabric secured to said plates respectively, and a tread of rubber compound or the like rigidly secured to said metallic fabric.

2. In a tire having annular side walls with clencher elements on the outer portions thereof respectively, the combination therewith of a tread element comprising a plurality of plates side by side in annular arrangement and having clencher elements adapted to interlock with the clencher elements of said side walls, an annular non-expansible pliable metallic fabric secured to said plates respectively, and a tread of rubber compound or the like rigidly secured to said metallic fabric, there being a second annular wire fabric within the body of said rubber compound and independent of said first mentioned wire fabric.

3. In a tire, the combination of two annular side walls separable from each other and having clencher elements on the outer and inner portions thereof respectively, a tread element comprising a plurality of plates side by side in annular arrangement and having clencher elements adapted to interlock with the outer clencher elements of said side walls, an annular non-expansible metallic fabric secured to said plates respectively, an inner tube between said side walls, a tread of rubber compound or the like rigidly secured to said metallic fabric, and a clencher rim in engagement with said inner clencher elements respectively, said clencher elements being such that when air is forced into said inner tube said side walls are maintained on said rim and said tread element is maintained on said side walls.

4. In a tire, the combination of side walls having clencher elements at their outer edge portions respectively, a plurality of plates side by side and hinged together forming an annular band, some of said plates being provided with clencher elements in engagement with the clencher elements of said side walls respectively, some of said plates having projections extending outwardly therefrom, and a resilient tread secured upon said projections, said projections being so positioned as to be wholly within the body of said tread.

5. In a tire having annular side walls with clencher elements on the outer portion thereof respectively, the combination therewith of a tread element comprising a plurality of plates side by side in annular arrangement and having clencher elements adapted to interlock with the clencher elements of said side walls, an annular substantially non-expansible and pliable fabric secured substantially against the outer faces of said plates respectively, an inner fabric adapted to rest substantially against the inner faces of said plates respectively, an inner tube between said side walls, and a tread of rubber compound or the like secured to said outer fabric.

6. In a tire having annular side walls with clencher elements on the outer portions thereof respectively, the combination therewith of a tread element comprising a plurality of plates side by side and hinged together in annular arrangement, said plates having clencher elements adapted to interlock with the clencher elements of said side walls, an annular substantially non-expansible and pliable fabric secured to said plates respectively, and a tread of rubber compound or the like rigidly secured to said fabric.

7. A tread for a tire, comprising in combination a plurality of plates side by side in annular arrangement, a flexible substantially non-expansible annular band secured to said plates on the outer surfaces thereof, a cushioning and sealing strip between said plates and band, the end portions of said plates being turned inward toward the axis of rotation of the tire for engagement with tire side walls, and an annular tread upon said annular band, said tread being less extensive than said plates in the directions of the tire width whereby the end portions of the plates are exposed.

8. A tread for a tire, comprising in combination a plurality of relatively narrow plates substantially flat between end portions thereof and positioned side by side in annular arrangement, a flexible non-expansible annular band secured to said plates, the end portions of said plates being turned inward toward the axis of rotation of the tire for engagement with tire side walls, and an annular tread carried by said plates and band.

9. A tread for a tire, comprising in combination a plurality of relatively narrow plates side by side in annular arrangement, a flexible non-expansible annular band secured to said plates, a cushioning and sealing strip between the plates and said band, the end portions of said plates being turned inward toward the axis of rotation of the tire for engagement with tire side walls, and an annular tread carried by said plates and band.

DE LEON DAVIS.

Witnesses:
MILTON T. MILLER,
M. M. KRIESAND.